H. R. LEONARD.
Improvement in Dynamometer-Wrenches.
No. 127,902. Patented June 11, 1872.

Witnesses:
Fredk. Aetos
Emma Greenaway

Inventor:
H. R. Leonard by
Dyer, Beade & Co.
atty

3 Sheets--Sheet 2.
H. R. LEONARD.
Improvement in Dynamometer-Wrenches.
No. 127,902.             Patented June 11, 1872.
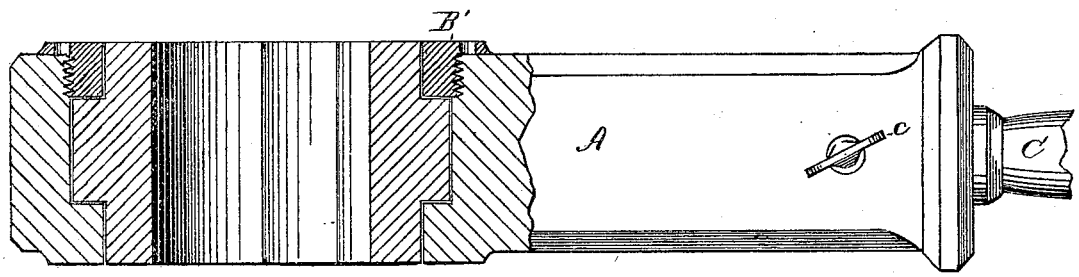
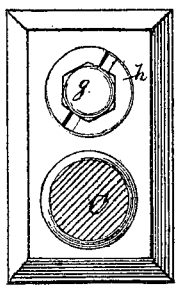
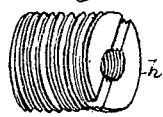
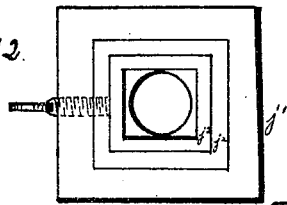
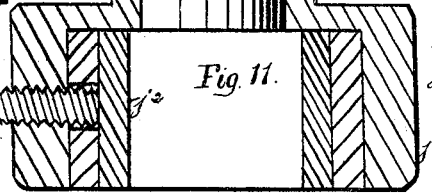
Witnesses:
Fredk. Artos
Emma Greenaway
Inventor:
H. R. Leonard by
Dyer, Beadle & Co.
Attys.

H. R. LEONARD.
Improvement in Dynamometer-Wrenches.
No. 127,902. Patented June 11, 1872.
3 Sheets--Sheet 3.
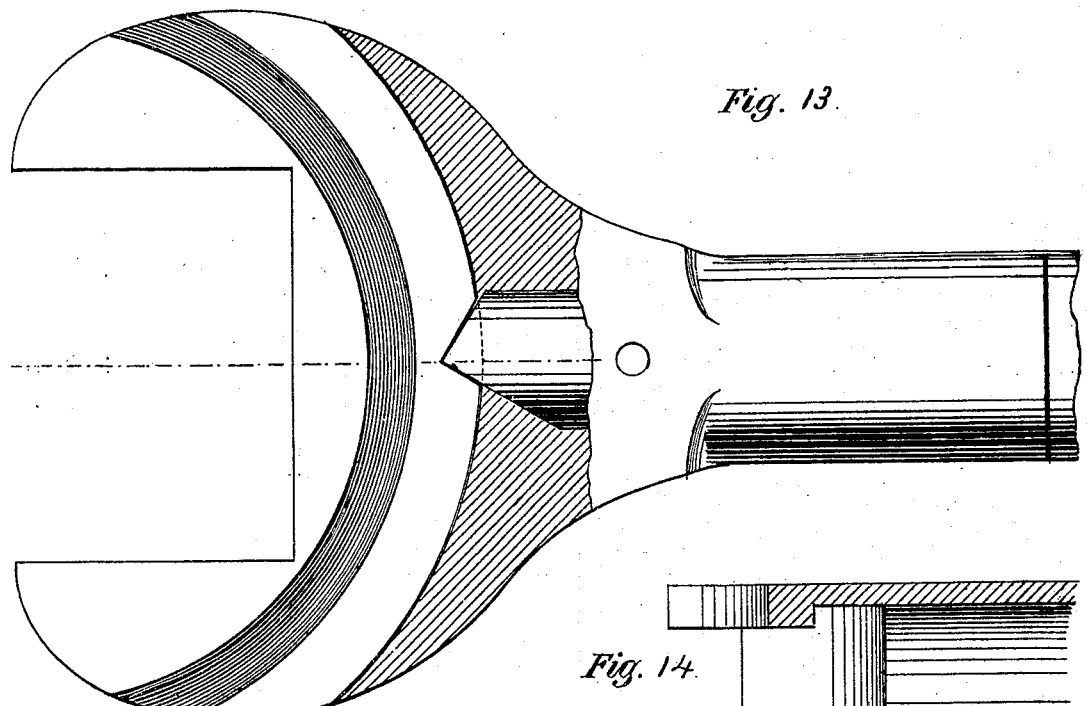
Fig. 13.
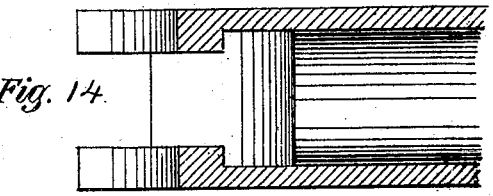
Fig. 14.
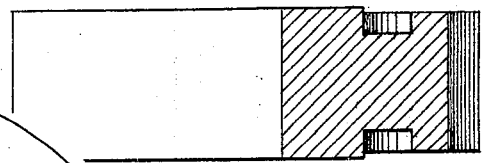
Fig. 15.
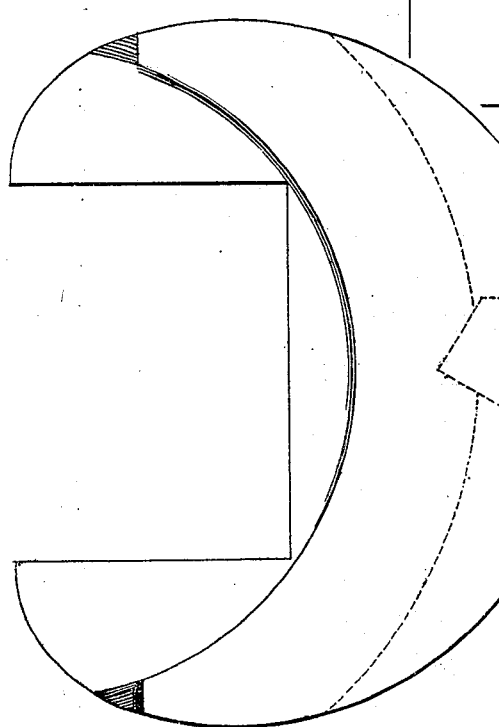
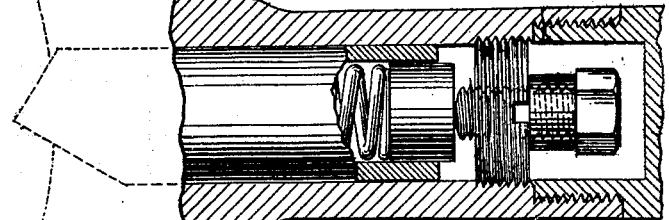
Fig. 16.
Witnesses:
Fredk. Artos
Emma Greenaway
Inventor:
H. R. Leonard by
Dya. Brada &c.
atty.

UNITED STATES PATENT OFFICE.

HARVEY REID LEONARD, OF PORTLAND, OREGON.

IMPROVEMENT IN DYNAMOMETER-WRENCHES.

Specification forming part of Letters Patent No. 127,902, dated June 11, 1872.

SPECIFICATION.

*To all whom it may concern:*

Be it known that I, HARVEY REID LEONARD, of Portland, in the county of Multnomah and State of Oregon, have invented a new and useful Improvement in Balance or Indicator Wrench; and I do hereby declare that the following is a full and exact description of the same, reference being had to the accompanying drawing and to the letters of reference marked thereon.

This invention consists of a wrench which, by means of special mechanism, is adapted, when operated, to turn a nut to indicate any given limit of strain by ceasing to operate. It is designed particularly for use in the construction of bridges and other similar structures, where it is essential that an equal or proportional strain shall be borne by all the supporting-rods; but it may be used, of course, for any of the various purposes for which it is adapted.

Figure 1:
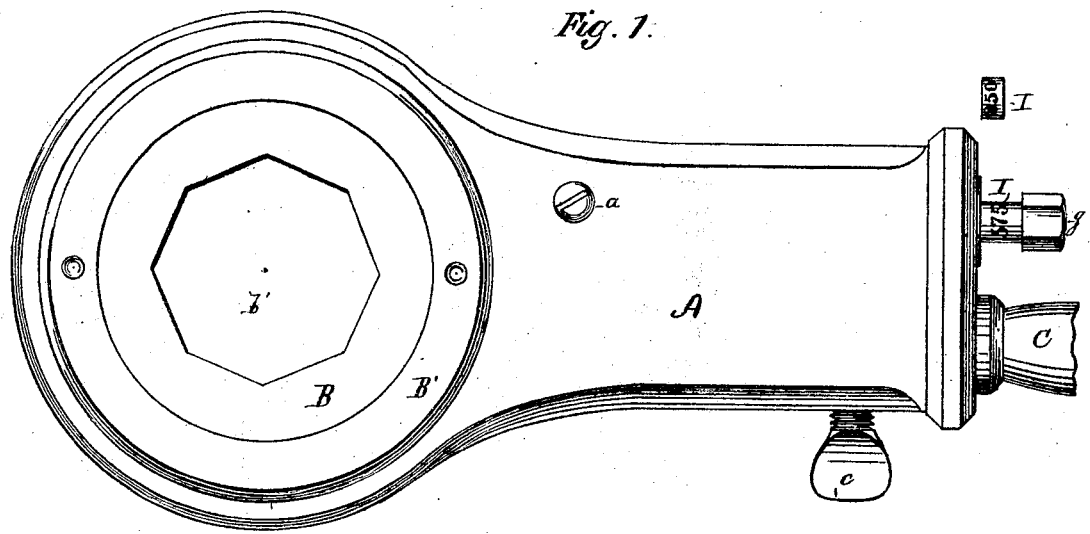
Figure 2:
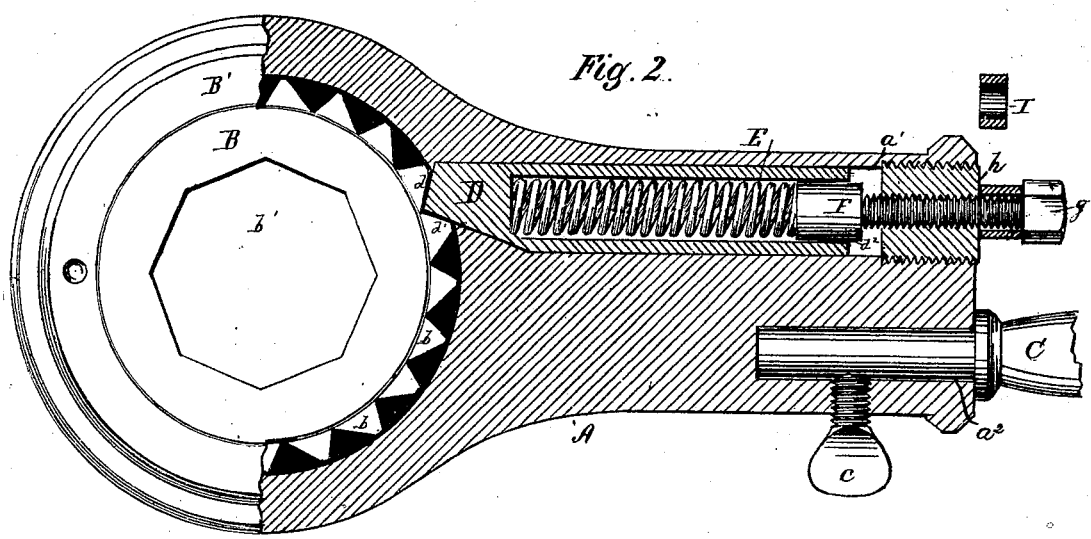
Figure 5:
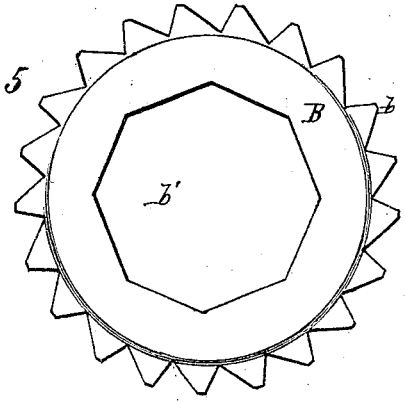

In the drawing, Figure 1 represents a plan view of my improved wrench; Fig. 2, a plan view, partially in section; Fig. 3, a side elevation, partially in section; Fig. 4, an elevation of the front end, with the handle in cross-section; Fig. 5, a plan view of the ratchet-wheel; Fig. 6, a detached view of the pawl, partially in section; Fig. 7, a perspective view of the follower; Fig. 8, a perspective view of the screw-stopper block; Fig. 9, a perspective view of one of the ferrules for regulating the adjusting-screw; Fig. 10, a view of the adjusting-screw; Fig. 11, a side elevation of the socket, with its bands for holding the nut. Fig. 12 represents a plan view of the same; and Figs. 13, 14, 15, and 16, various views of a modified form of my improved wrench.

To enable others skilled in the art to make and use my invention, I will now proceed to describe fully its construction and operation.

A represents the main portion or shell of the wrench, constructed preferably of tough brass or malleable iron, which is provided at one end with a circular opening for the reception of the ratchet-wheel B, and also with longitudinal openings $a^1$ $a^2$ for the reception of the indicating mechanism and for the handle C, which latter is held in position by means of the set-screw $c$, as shown. The ratchet-wheel B, which should be constructed of good steel, is provided on its circumference with a series of teeth, $b$, and with a central opening, $b'$, as shown. B' represents a ring, by means of which the ratchet-wheel is secured in place. The indicating mechanism is clearly shown in Fig. 2. D represents a pawl or tongue of steel, provided at one end with the inclined faces $d$ $d^1$, and also with the central socket $d^2$, in which latter is located the spiral spring E, as shown. F represents a follower, adapted to slide easily in the socket $d^2$, which is held in place and adjusted by means of the set-screw $g$, which latter turns in the screw-stopper block $h$, which closes the opening $a^1$ of the shell A. By adjusting the set-screw $g$ the amount of the pressure of the pawl against the ratchet-wheel is determined. In order that this adjustment may be accurately made to indicate exact quantities I employ ferrules I of different widths, as indicated in Figs. 1 and 2, the amount of pressure exerted by each being previously determined by proper experiment. J, Figs. 11 and 12, represents a socket, having a portion, $j$, adapted to fit into the central opening of the ratchet-wheel, and a square portion, $j^1$, adapted to surround and hold the nut. $a$, Fig. 1, represents a screw-stopper, which closes an orifice designed to permit the introduction of lubricating material to the pawl. By the employment of a series of bands, $j^2$, fitting into the socket and into each other, any size of nut may be operated upon.

The operation is as follows: The socket is placed upon the nut and the wrench is placed over the socket. Power then being exerted in the proper direction, the nut is turned upon the rod in the usual manner, the return movement of the handle being effected similarly to the ordinary ratchet-wrench, the surface $d$ of the pawl and the corresponding surface of the ratchet-wheel being of such an incline as will permit the parts readily to pass each other. When thus operated it differs in no respect from the ordinary ratchet-wrench; but when in using it a certain limit of strain has been reached, for which the wrench has been previously adjusted, it ceases to operate, because the face $d^1$ of the pawl slips past the corresponding surface of the ratchet-wheel.

From this description it will be observed that the principle of operation is simply this: That the pawl is free to slip in one direction on account of the gentle inclination of the bearing-surface, while in the other direction it cannot slip without the exertion of great pressure, because the bearing-surfaces are abruptly inclined, the amount of pressure required being determined by the pressure of the spring, which is regulated by the adjusting-screw. The method of testing the spring to determine the amount of compressure required to cause it to hold the ratchet until a desired limit of power has been reached is as follows: A rod is attached to the beam of a scale in such a manner that the strain of the weights applied to the scale is borne by the nut. The scale is then weighted with a given amount, and the wrench being applied to the nut, the screw is adjusted until the wrench ceases to operate. The position of the adjusting-screw is then noted, and a ferrule of proper width, when in place, to limit its movement to this point, is made and marked with the number of pounds weight upon the scale. The weight upon the scale may then be changed, and the position of the adjusting-screw again be found and a new ferrule be made, as before.

A modification of my wrench is shown in Figs. 11, 12, and 13, consisting of a pawl similarly arranged, which is employed in connection with an open jaw having a single recess for the reception of the pawl. The jaw is provided upon each side with a recess, in which rest corresponding projections upon the shell of the wrench. This is designed for use in those places when a closed jaw cannot be employed. A number of jaws of different sizes can be adapted for use in the same wrench.

My invention, as before suggested, may be used for any purpose for which it is adapted. It may be used for testing the strength of materials, or for testing the strength of rods before being put in place, or in the manufacture of bolts and nuts for securing equal amount of friction in turning on the nuts. It may also be used for equally straining standing rigging on vessels, and for a dynamometer by placing it between the stationary power and the power to be measured by means of suitable coupling.

Having thus fully described my invention, what I claim as new, and desire to secure by Letters Patent, is—

1. A wrench provided with a spring-pawl having an abruptly-inclined bearing-surface, and a jaw or ring having a corresponding surface, the parts being so constructed and arranged that the wrench will operate to turn a nut until a predetermined limit of strain has been reached, when the bearing-surfaces will slip by each other and the wrench cease to operate, substantially as described.

2. The elements above claimed in combination with means, substantially as described, for adjusting the pawl so as to render it capable of pressing with varying power upon the ring or jaw for the purpose of indicating various limits of strain, as described.

3. The combination of the shell A, ratchet-wheel B, pawl D with follower F and adjusting-screw g, as described.

H. R. LEONARD.

Signed in the presence of—
W. W. PIPER,
EUGENE SEMPLE,
O. F. BELL.